United States Patent [19]

Rogers

[11] 4,105,974
[45] Aug. 8, 1978

[54] PRIORITY INTERRUPT CIRCUIT

[76] Inventor: Edwin F. Rogers, P.O. Box 186, Syracuse, Ind. 46567

[21] Appl. No.: 621,823

[22] Filed: Oct. 14, 1975

[51] Int. Cl.² .............................................. H04B 1/38
[52] U.S. Cl. ....................................... 325/21; 325/303
[58] Field of Search ................. 325/21, 22, 57, 303, 325/304, 466, 18, 15; 343/227, 228, 205, 207; 179/1 SW, 1 VC, 1 CN

[56] References Cited

U.S. PATENT DOCUMENTS

| | | | |
|---|---|---|---|
| 2,330,241 | 9/1943 | Roberts | 325/303 X |
| 2,962,584 | 11/1960 | Lackoff | 325/22 |
| 3,277,374 | 10/1966 | Kobayashi | 325/303 X |
| 3,921,074 | 11/1975 | Baird | 325/303 |
| 3,956,591 | 5/1976 | Gates, Jr. | 179/1 SW |

Primary Examiner—Benedict V. Safourek
Attorney, Agent, or Firm—Gust, Irish, Jeffers & Rickert

[57] ABSTRACT

A priority interrupt circuit for inhibiting the supply of signals from a first audio signal source to an electroacoustic transducer and substituting therefore signals from a second audio signal source in response to the occurrence of signals from the second source and despite the continued availability of signals from the first source is disclosed having the further capability of effecting the substitution of the second source for the first source when a radio frequency transmitter is enabled.

11 Claims, 1 Drawing Figure

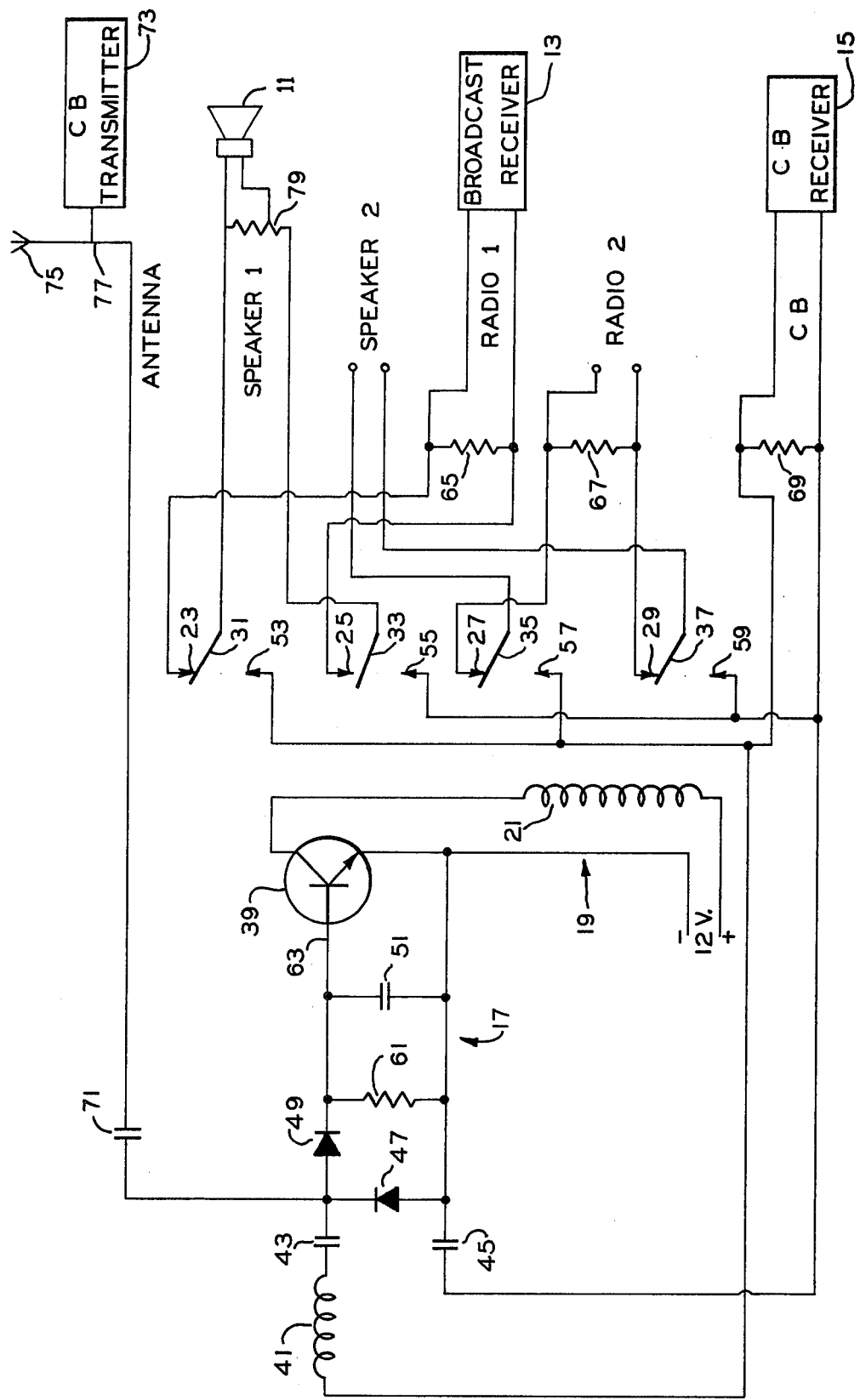

PRIORITY INTERRUPT CIRCUIT

BACKGROUND OF THE INVENTION

Field of the Invention

The present invention relates to interrupt systems generally and more especially to a priority interrupt circuit for disconnecting a first audio frequency source from an electroacoustic transducer and connecting a second audio frequency source thereto when that second source becomes active.

Citizens band mobile transceivers have become quite popular, however their use does present some problems to the user. Such citizen band transceivers are normally installed in a vehicle having one or more independent sources of audio entertainment such as a broadcast receiver or tape deck and when preparing to transmit the user must turn down the volume on such audio entertainment devices or turn them completely off prior to his transmission to prevent a confused transmission. Also, incoming signals on the citizens band receiver may be partially or completely missed by the user when both audio sources are operating at the same time. In general, the entertainment audio source while desired, presents difficulties and possible confusion for the citizens band user.

A certain reduction in the hand switching operations required in radio transmission has been achieved by employing voice operated relays. Such voice operated relays are generally employed in fixed based amateur radio work and are employed only to the extent that they replace the typical push-to-talk switch and additionally include circuitry for rendering the relay inoperable so long as incoming signals are present. Due to the noise involved in a mobile environment, the use of such voice operated relays therein would be severely limited.

SUMMARY OF THE INVENTION

Among the several objects of the present invention may be noted the provision of a circuit for diminishing one audio frequency signal to a transducer upon the occurrence of an audio frequency signal from another source;

the provision of a circuit for diminishing an audio frequency signal to a transducer when a radio frequency transmitter is enabled;

the provision of an audio interrupt circuit applicable to standard AM, AM-FM receivers, scanners, and other receivers as well as tape players all in either monaural or stereophonic modes as well as other audio signal sources;

the provision of a priority interrupt system which reacts rapidly to the occurrence of the interrupting event with a delay after termination of that event before returning to normal status; and the provision of a priority interrupt system characterized by its economy of manufacture ease of installation and wide range of applicability.

In general, and in one form of the invention, a transmitter is monitored for the presence of radio frequency output signals and the magnitude of audio frequency signals supplied to a transducer is diminished when the presence of such radio frequency signals is detected.

Also in general, a first audio signal source is normally coupled to an electroacoustic transducer, while a second audio signal source is monitored for the presence of an audio signal. When an audio signal is detected from the second source the first source is uncoupled from the transducer and the second source substituted therefore.

The above mentioned and other features and objects of the invention and the manner of attaining them will become more apparent and the invention itself will be best understood by reference to the following description taken in conjunction with the accompanying drawings.

BRIEF DESCRIPTION OF THE DRAWING

The drawing FIGURE illustrates in schematic form one form of a priority interrupt system according to the present invention.

The following example illustrates the invention in one form and is not to be construed as limiting in any manner.

DESCRIPTION OF THE PREFERRED EMBODIMENT

In general, the system shown in the drawing includes an electroacoustic transducer 11, a first audio signal source 13 for supplying audio frequency signals to the transducer 11, a second audio signal source 15, which typically has audio frequency output signals only intermittently, circuitry 17 for monitoring source 15 for the presence of audio frequency signals and circuitry 19 to diminish the magnitude of the signals from the source 13 to the transducer 11 when signals from source 15 are detected.

The priority interrupt circuitry is built around a coil actuated relay having an actuating coil 21 with the contacts 23, 25, 27 and 29 normally contacting blades 31, 33, 35 and 37 when the coil is deenergized. The actuating coil 21 is connected in series with semiconductor switching device 39 to a direct current source. With contacts 23 and 31, and 25 and 33 normally closed, as illustrated, when the coil 21 is not energized, a standard broadcast receiver 13 is connected to the loud speaker 11 for normal operation. A second radio may be connected to relay terminal 27 and 29 and a second speaker connected to relay contacts or blades 35 and 37 to provide for a second receiver, tape deck, or in conjunction with the radio number 1 input, sterophonic sound. A relay having more than four blades could obviously be used for additional audio entertainment sources.

A citizens band receiver 15 or other intermittent source of audio frequency signals is monitored for the presence of an audio frequency signal by coupling its output by way of radio frequency choke 41 and capacitors 43 and 45 to circuit 17. A pair of diodes 47 and 49 function to rectify the audio signal output and charge the capacitor 51 whenever such audio frequency signal is present. The time constant for charging capacitor 51 is, due to the very low forward resistance of the diodes, quite small and substantially less than the time constant for discharging capacitor 51. When the charge on capacitor 51 reaches a specified value, the semiconducting switching device 39 is rendered conductive to pass current from the 12 volt direct current source through relay actuating coil 21, thereby connecting the receiver 15 by way of contact 53 and blade 31 on the one hand and contact 55 and blade 33 on the other to the loud speaker 11. So long as an audio frequency signal is present at the output of receiver 15 and despite the presence of audio frequency signals from the receiver 13, sufficient charge will be maintained on capacitor 51 to maintain the semiconductor switch 39 in its conducting state and continue the connection of receiver 15 to the speaker 11. If a second speaker is connected to the speaker number 2 terminals, this second speaker will also receive by way of contacts 57 and blade 35 on the one hand and contact 59 and blade 37 on the other, the audio frequency signals from the receiver 15.

When the audio frequency signal from the receiver 15 disappears, capacitor 51 begins to discharge by way of resistor 61 and to a certain extent, by way of the control electrode 63 of the semiconductor switching device 39. Employing a one megohm resistor 61 and a ten microfarad capacitor 51, about two seconds is required for the voltage on capacitor 51 to diminish to the point where the switching device 39 resumes its nonconducting state, deenergizing relay coil 21, and reconnecting the broadcast receiver 13 to the speaker 11.

In the preferred embodiment illustrated, semiconductor switching device 39 comprises a Darlington amplifier which is in essence a pair of simple transistors having their collectors connected together with the emitter of the first transistor coupled directly to the base of the second transistor and the base of the first transistor constituting the control electrode 63. Also, in the illustrated preferred embodiment, three 10 ohm resistors 65, 67, and 69 are connected across the respective audio frequency sources such as 13 and 15 to insure that those sources do not operate under unloaded conditions, thereby preventing possible damage to output transistors and the like. Further, in the illustrated preferred embodiment, three 0.05 microfarad capacitors 43, 45 and 71 are included for isolation purposes to insure that inputs are not grounded since the device is intended to operate on either positive ground or negative ground systems with a variety of different receivers and transmitters.

Capacitor 71 couples the circuitry which monitors for the presence of audio frequency signals to a source of radio frequency signals so that the monitoring circuit may also detect those radio frequency signals and effect the diminution or disconnecting of the broadcast receiver from its transducer or loud speaker. In the illustrated embodiment a citizens band transmitter 73 which of course may be in the same package with and share components with the citizens band receiver 15, has its output coupled to an antenna 75 in the normal fashion, however, at junction 77 a T-connector is provided for connection by way of capacitor 71 to the monitoring circuitry. When a radio frequency output is applied to the antenna the capacitor 71 passes that signal through diode 49 to charge the capacitor 51 and cause the Darlington amplifier 39 to conduct, energizing relay coil 21 and connecting the receiver 15 to speaker 11 while disconnecting the broadcast receiver 13. Capacitor 51 charges rapidly and radio frequency choke 41 prevents the passage of any radio frequency signals from the transmitter to, for example, the resistor 69, therefore the sensing circuitry coupled to the transmitter 73 has little or no loading effect thereon and the radiated power from the transmitter is substantially the same as it would have been without the sensing circuitry of the present invention.

From the foregoing, it is now apparent that a novel priority interrupt circuit and system have been presented meeting the objects and advantageous features set out hereinbefore as well as others. Numerous modifications will now readily suggest themselves to those of ordinary skill in the art. For example, the sensitivity of the interrupt circuit as described is determined by the volume level on the output of the receiver 15. If the desired sensitivity level would happen to result in unpleasantly loud signals from the output transducer 11, a potentiometer 79 of about 50 ohms may be added to the speaker circuitry to reduce the output to a desired level. Further a double pole, double throw switch might be inserted to selectively couple the receiver 15 to its own internal speaker rather than to the circuitry of the present invention. While the illustrated relay diminishes the magnitude of the audio frequency signal supplied from the receiver 13 to the speaker 11 by completely disconnecting the receiver 13, it would be relatively easy to merely introduce additional impedance in the speaker line to thereby only reduce the level of the audio output. Still further, while a relay has been illustrated as one easy means of implementing the switching function of the present invention, solid state logic circuitry could be readily designed to provide this function. It is therefore contemplated that changes as to the arrangement, details, and connections of the component parts may be made by those skilled in the art without departing from the spirit or scope of the invention as set out in the claims which follow.

What is claimed is:

1. A priority interrupt system comprising:
   at least one electroacoustic transducer;
   a first audio signal source for supplying audio frequency signals to the transducer;
   a second audio signal source;
   means for monitoring the second audio signal source for the presence of any audio frequency signals, the means for monitoring including a capacitor and diode means coupled to the second audio signal source for charging the capacitor when audio frequency signals are present;
   means responsive to detection by the monitoring means of an audio frequency signal to diminish the magnitude of audio frequency signals supplied to the transducer from the first audio signal source, the responsive means responding to the voltage on the capacitor exceeding a specified value, the responsive means further comprising a resistor connected in parallel with the capacitor to slowly discharge the capacitor to thereby disable the responsive means and reestablish the undiminished supply of audio frequency signals from the first source to the transducer in the absence of audio frequency signals from the second source for a predetermined time interval; and
   a radio frequency transmitter, the means for monitoring further adapted to sense signals from the radio frequency transmitter and to cause the said capacitor to charge and the said responsive means to diminish the magnitude of audio frequency signals supplied to the transducer from the first audio signal source when radio frequency signals are detected.

2. The system of claim 1 wherein said responsive means is effective to completely disconnect the first audio signal source from the transducer.

3. The system of claim 2 further comprising means associated with the said responsive means for coupling the second audio signal source to the transducer when the first audio signal source is disconnected from the transducer.

4. The system of claim 1 wherein the capacitor may slowly discharge through the parallel connected resistor only in the absence of both an audio frequency signal from the second source and a radio frequency signal from the radio frequency transmitter.

5. In a system including a radio frequency transmitter, an electroacoustic transducer, and an audio signal source for supplying audio frequency signals to the transducer, the improvement comprising:
  means monitoring the transmitter for the presence of radio frequency output signals, the means for monitoring including a capacitor, and diode means coupled between the radio frequency transmitter and the capacitor for charging the capacitor when the radio frequency transmitter is producing radio frequency output signals;
  means coupled to the monitoring means and operable when enabled thereby to diminish the magnitude of the audio frequency signals supplied to the transducer; and
  an intermittent audio frequency signal source, radio frequency choke means coupling the diode means to the intermittent audio frequency signal source whereby the occurence of an audio frequency signal will also diminish the magnitude of the audio frequency signals supplied from the audio signal source to the transducer, the radio frequency choke means preventing the loading of the radio frequency transmitter output by the intermittent audio frequency signal source.

6. A priority interrupt circuit for first and second audio signal sources and a radio frequency transmitter comprising:
  first means for normally coupling the first audio signal source to an electroacoustic transducer;
  second means for monitoring the second audio signal source and the radio frequency transmitter for the presence of respective audio frequency signals and radio frequency signals; and
  means responsive to the sensing of the presence of a respective signal by the second means for controlling the first means to uncouple the first audio signal source from the transducer.

7. The priority interrupt circuit of claim 6 wherein the first means comprises a coil actuated relay with normally closed contacts interconnecting the first audio signal source and the electroacoustic transducer.

8. The priority interrupt circuit of claim 7 wherein the responsive means comprises a semiconductor switching device connected in series with the relay actuating coil and having a control electrode coupled to the second means.

9. The priority interrupt circuit of claim 8 wherein the semiconductor switching device is a Darlington amplifier.

10. The priority interrupt circuit of claim 8 wherein the second means comprises a capacitor, and diode means coupled to the second audio source and to the radio frequency transmitter for charging the capacitor when respective signals are present, the voltage across the capacitor being applied to the semiconductor switching device control electrode to cause the semiconductor switching device to conduct and energize the relay when the capacitor voltage exceeds a predetermined value.

11. The priority interrupt circuit of claim 10 further comprising a resistor connected in parallel with the capacitor to slowly discharge the capacitor, the time constant for charging the capacitor in response to the occurrence of a respective signal being substantially less than the time constant for discharging the capacitor through the resistor in the absence of a respective signal.

* * * * *